(12) United States Patent
Chen et al.

(10) Patent No.: US 10,601,677 B2
(45) Date of Patent: Mar. 24, 2020

(54) DEVICE AND METHOD FOR A DYNAMIC VIRTUAL PRIVATE NETWORK AND COMPUTER READABLE RECORDING MEDIUM

(71) Applicants: Chung-Chih Chen, Hsinchu County (TW); Shi-Ming Zhao, Hsinchu County (TW)

(72) Inventors: Chung-Chih Chen, Hsinchu County (TW); Shi-Ming Zhao, Hsinchu County (TW)

(73) Assignee: INFORICH ELECTRONICS CORP., Taipei (TW)

( * ) Notice: Subject to any disclaimer, the term of this patent is extended or adjusted under 35 U.S.C. 154(b) by 69 days.

(21) Appl. No.: 16/045,285

(22) Filed: Jul. 25, 2018

(65) Prior Publication Data

US 2020/0036600 A1 Jan. 30, 2020

(51) Int. Cl.
*H04L 12/24* (2006.01)
*H04L 29/08* (2006.01)
*H04L 12/46* (2006.01)

(52) U.S. Cl.
CPC .......... *H04L 41/28* (2013.01); *H04L 12/4633* (2013.01); *H04L 67/20* (2013.01)

(58) Field of Classification Search
CPC ... H04L 41/22; H04L 41/0803; G06F 16/285; G06F 16/288; G06F 3/0482
USPC ........................................................ 709/223
See application file for complete search history.

(56) References Cited

U.S. PATENT DOCUMENTS

| | | | |
|---|---|---|---|
| 9,516,053 B1* | 12/2016 | Muddu | G06F 16/285 |
| 10,148,493 B1* | 12/2018 | Ennis, Jr. | G06F 9/54 |
| 2003/0140131 A1* | 7/2003 | Chandrashekhar | H04L 12/4641 709/223 |
| 2015/0249644 A1* | 9/2015 | Xu | H04L 63/0272 726/1 |
| 2018/0176194 A1* | 6/2018 | Xiong | H04W 76/12 |
| 2019/0327312 A1* | 10/2019 | Gupta | H04L 63/0272 |

* cited by examiner

*Primary Examiner* — Tauqir Hussain
(74) *Attorney, Agent, or Firm* — Che-Yang Chen; Law Offices of Scott Warmuth (57) ABSTRACT

The invention provides a method for a dynamical virtual a private network, which is suitable for a main device in a dynamic virtual private network. The method comprises: (a) before the main device establishes a tunneling connection, acquiring a request for adding a sub-device to a whitelist directly or through a third-party cloud service and sending an acceptance message or a rejection message to the sub-device accordingly thereto; (b) acquiring a request for connecting with the sub-device directly or through the third-party cloud service, and determining whether the tunneling connection with the sub-device is established or not accordingly thereto or sending a rejection message to the sub-device; (c) after the tunneling connection is established between the main device and the sub-device, receiving a connection code sent from the sub-device through the tunneling connection, and determining whether the connection code sent from the sub-device is correct or not.

14 Claims, 10 Drawing Sheets

DEVICE AND METHOD FOR A DYNAMIC VIRTUAL PRIVATE NETWORK AND COMPUTER READABLE RECORDING MEDIUM

FIELD OF THE INVENTION

The present invention relates to devices in a virtual private network. More particularly, the present invention relates to a device and a method for a dynamic virtual private network, and a computer readable recording medium.

BACKGROUND OF THE INVENTION

When a virtual private network server is set, it is a must to perform complex network communication parameter settings, such as network addresses, connection ports and many other settings, for itself or an Internet gateway. It makes those who are not familiar with network settings feel lost. In addition, in setting methods of prior arts, it is often that the virtual private network terminal device has to carry out professional setting procedures with the server. Moreover, many servers further need to acquire setting files generated by themselves after the professional setting procedures and store the setting files to a terminal device, to perform tunneling connection via software of the virtual private network when accessing Internet from a remote end. When there are many terminal devices in the remote end to access the virtual private network, such setting procedures and acquisition processes for the setting files will consume a considerable amount of time and vitality. Furthermore, if the setup process fails or causes problems, or the setting files are lost or damaged, it often results in that the virtual private network cannot be used. In addition, one of the purposes of the above settings is to allow the virtual private network server to be opened on the Internet, making virtual private network terminal devices able to connect thereto. However, the open results are very likely to create a security loophole.

In addition, for conventional virtual private network technologies, in order to simplify connection settings, it is often required to create a network proxy server, and online provide exclusive software APP for connection or network communication parameters for the connected virtual private network server, so that connection can be achieved via such proxy server. However, through the virtual private network technology to build up the network proxy server, it must pay a considerable amount of operation cost. For service and device providers, the cost is not cheap.

Hence, the above technologies on the virtual private network still need to improve so that setting connections for the virtual private network is more convenient and safer, almost without maintaining and operating expenses.

SUMMARY OF THE INVENTION

In the light of this, a device and a method for a dynamic virtual private network provided in the present invention can enhance convenience and security in settings for the dynamic virtual private network. They can also make the connection of the dynamic virtual private network built more safely.

According to one aspect of the present invention, in order to solve the difficulty when processing basic connection settings between virtual private network servers and virtual private network client ends, in some embodiments of the present invention, a main device and a sub-device in the dynamic virtual private network have a setting mode which makes it more convenient and friendly to establish settings, e.g. a whitelist, for connections of the dynamic virtual private network for users. Meanwhile, there is no need to make any setting changes to its Internet gateway. It significantly simplifies the connection setup process and reduces the time required to set up the dynamic virtual private network. It is no longer necessary to open the virtual private network server on the Internet. This will undoubtedly enhance the convenience and security of the settings of the dynamic virtual private network.

According to another aspect of the present invention, in order to further strengthen the security of the connection between the main device and the sub-device in the dynamic virtual private network and save the cost for connecting, in some embodiments of the present invention, the main device and the sub-device in the dynamic virtual private network can perform communication directly or through a third-party cloud network service before a tunneling connection is established, so as to execute various settings or processes. In addition, it can further process identity verification after the tunneling connection is established to determine whether to maintain the tunneling connection. Said third-party cloud network service may be not self-established and trusted by people. Thus, it makes the connection built between the main device and the sub-device in the dynamic virtual private network more secure with almost no cost.

According to the present invention, a method for a dynamic virtual private network is provided. It is suitable for a main device in a dynamic virtual private network. The method includes the steps of: (a) before the main device in the dynamic virtual private network establishes a tunneling connection, acquiring a request for adding a sub-device to a whitelist directly or through a third-party cloud service and sending an acceptance message or a rejection message to the sub-device accordingly thereto; (b) before the main device in the dynamic virtual private network establishes the tunneling connection, acquiring a request for connecting with the sub-device directly or through the third-party cloud service, and determining whether the tunneling connection with the sub-device is established or not accordingly thereto or sending a rejection message to the sub-device; and (c) after the main device in the dynamic virtual private network establishes the tunneling connection with the sub-device, receiving a connection code sent from the sub-device through the tunneling connection, and determining whether the connection code sent from the sub-device is correct or not; if the connection code is correct, the tunneling connection is maintained; if the connection code is incorrect, the tunneling connection is interrupted; wherein the connection code is able to be further encoded to enhance security.

According to the present invention, a computer readable recording medium is provided. It stores with one or more program modules and causes a device in a dynamic virtual private network to perform said method suitable for a main device in the dynamic virtual private network when said one or more program modules are carried out by the device in the dynamic virtual private network.

According to another aspect of the present invention, a dynamic virtual private network device is provided. It is suitable for a main device in a dynamic virtual private network. The dynamic virtual private network device includes: a network unit, connected to a network, providing a network communication; a memory unit; and a processing unit, coupled with the network unit and the memory unit, wherein: before the main device in the dynamic virtual private network establishes a tunneling connection, the processing unit controls the network unit directly or through a third-party cloud service to acquire a request for adding a sub-device to a whitelist, and send an acceptance message or a rejection message to the sub-device accordingly thereto; before the main device in the dynamic virtual private network establishes the tunneling connection, the processing unit controls the network unit directly or through the third-party cloud service to acquire a request for connecting with the sub-device, and the processing unit determines whether the tunneling connection with the sub-device is established or not accordingly thereto or sending a rejection message to the sub-device; after the main device in the dynamic virtual private network establishes the tunneling connection with the sub-device, the processing unit controls the network unit to receive a connection code sent from the sub-device through the tunneling connection, and the processing unit determines whether the connection code sent from the sub-device is correct or not; if the connection code is correct, the processing unit maintains the tunneling connection; if the connection code is incorrect, the processing unit controls the network unit to interrupt the tunneling connection; wherein the connection code is able to be further encoded to enhance security.

According to another aspect of the present invention, a method for a dynamic virtual private network is provided. It is suitable for a sub-device in a dynamic virtual private network. The method includes the steps of: (a) before the sub-device in the dynamic virtual private network establishes a tunneling connection, sending a request for adding the sub-device to a whitelist to a main device directly or through a third-party cloud service and acquiring an acceptance message or a rejection message from the main device accordingly thereto; (b) before the sub-device in the dynamic virtual private network establishes the tunneling connection, sending a request for connecting with the sub-device to the main device directly or through the third-party cloud service, and establishing the tunneling connection with the main device accordingly thereto; and (c) after the sub-device in the dynamic virtual private network establishes the tunneling connection with the main device, sending a connection code from the sub-device in the dynamic virtual private network to the main device through the tunneling connection, so that the main device determines whether to maintain or interrupt the tunneling connection; wherein the connection code is able to be further encoded to enhance security.

According to another aspect of the present invention, a computer readable recording medium is provided. It stores with one or more program modules and causes a device in a dynamic virtual private network to perform said method suitable for a sub-device in the dynamic virtual private network when said one or more program modules are carried out by the device in the dynamic virtual private network.

According to another aspect of the present invention, a dynamic virtual private network device is provided. It is suitable for a sub-device in a dynamic virtual private network. The dynamic virtual private network device includes: a network unit, connected to a network, providing a network communication; a memory unit; and a processing unit, coupled with the network unit and the memory unit, wherein: before the sub-device in the dynamic virtual private network establishes a tunneling connection, the processing unit controls the network unit directly or through a third-party cloud service to send a request for adding the sub-device in the dynamic virtual private network to a whitelist to the main device, and acquire an acceptance message or a rejection message from the main device accordingly thereto; before the sub-device in the dynamic virtual private network establishes a tunneling connection, the processing unit controls the network unit directly or through the third-party cloud service to send a request for connecting the sub-device in the dynamic virtual private network to the main device, and establish the tunneling connection with the main device; and after the sub-device in the dynamic virtual private network establishes the tunneling connection with the main device, the processing unit controls the network unit through the tunneling connection to send a connection code of the sub-device in the dynamic virtual private network to the main device, so that the main device determines whether to maintain or interrupt the tunneling connection; wherein the connection code is able to be further encoded to enhance security.

DETAILED DESCRIPTION OF THE PREFERRED EMBODIMENTS

Provided below are a number of embodiments of methods and devices for a dynamic virtual private network device, illustrating embodiments in different aspects of the present invention.

Figure 1:
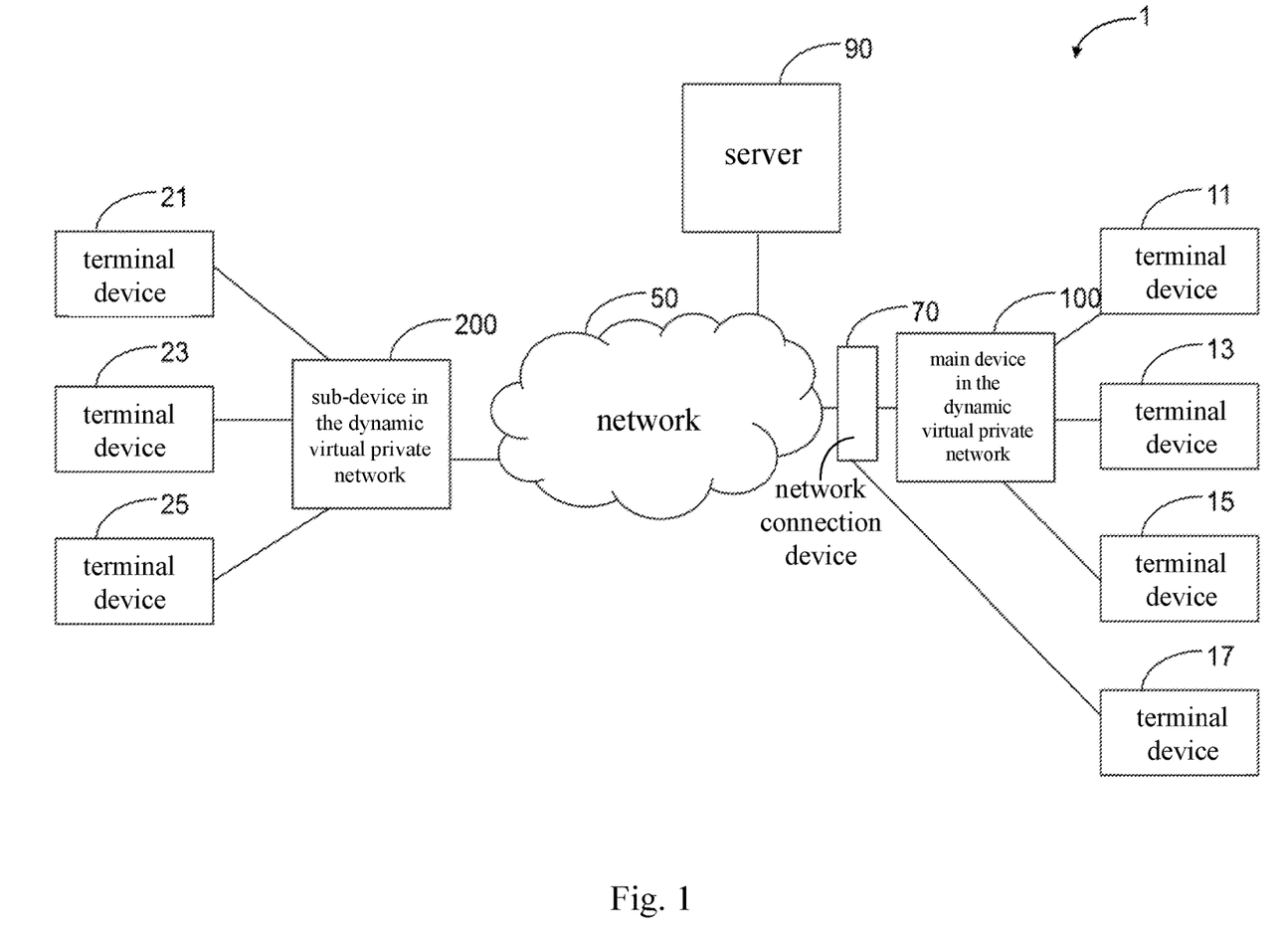
FIG. 1 shows a schematic block diagram of an embodiment according to a dynamic virtual private network system of the present invention.

FIG. 1 shows a schematic block diagram of an embodiment according to a dynamic virtual private network system of the present invention. As shown in FIG. 1, a dynamic virtual private network system 1 includes a main device 100 in a dynamic virtual private network and a sub-device 200 in the dynamic virtual private network. For example, the main device 100 in the dynamic virtual private network is used as a dynamic virtual private network server (VPN Server). The main device 100 in the dynamic virtual private network is able to be configured in one location, e.g. home or office, and connected to a network. It may have a public or private network address, i.e. IP address, which can further let one or a plurality of terminal devices, e.g. terminal devices 11, 13, 15, and 17 wiredly or wirelessly form a local area network or connect to the network via the main device 100 in the dynamic virtual private network. For example, the sub-device 200 in the dynamic virtual private network is used as a client end in the dynamic virtual private network (VPN client). The sub-device 200 in the dynamic virtual private network can be placed in a remote location, e.g. home, office or public place, related to the main device 100 in the dynamic virtual private network and connect to the network. It has may have a public or private network address, i.e. IP address, which can further let one or a plurality of terminal devices, e.g. terminal devices 21, 23, and 25 form the virtual private network by the sub-device 200 in the dynamic virtual private network and the main device 100 in the dynamic virtual private network through the network. Said terminal devices may be any device capable of connecting to the network, such as a computer, a smart device, a printer, or a webcam. However, the present invention is not restricted by such examples. In addition, said network in the description may be a communication architecture formed by at least one or a plurality of communication protocols, wired or wireless, or a combination thereof; For example, a network 50 shown in FIG. 1 may be a communication network based on TCP/IP, such as the Internet. In addition, the network 50 may also be a mobile communication network. In addition, the network 50 may also be a communication architecture composed of the Internet and the communication network. The network 50 may include: at least one of the public switched telephone network, optical fiber network, mobile communication network, or a combination thereof. However, the present invention is not restricted by such examples. The network 50 in FIG. 1 can be anything making connections of communications between the main device 100 in the dynamic virtual private network and the sub-device 200 in the dynamic virtual private network communication. In addition, in one embodiment, as shown in FIG. 1, the main device 100 in the dynamic virtual private network or the terminal device, (e.g. 17) may connects to the network 50 via a network connection device 70. However, the present invention is not limited thereto.

After users set up basic connections for the main device 100 in the dynamic virtual private network and the sub-device 200 in the dynamic virtual private network, on one hand, it is able to keep the connection between the main device 100 in the dynamic virtual private network and the network 50; on the other hand, the sub-device 200 in the dynamic virtual private network can be placed in a remote end. After connecting to the network 50, e.g., Internet or a mobile data network, of a combination thereof (the present invention is not limited thereby), through a local network service provider, it is further to make the sub-device 200 in the dynamic virtual private network connect to the main device 100 in the dynamic virtual private network from the remote end with security encryption by virtual private network technology, such tunneling technology, encryption/decryption technology, key management technology, user and device identity authentication, etc. Thus, the terminal devices 21, 23 and 25 in the remote end can securely communicate with the main device 100 in the dynamic virtual private network via the sub-device 200 in the dynamic virtual private network, thereby accessing network resources in the main device 100 in the dynamic virtual private network.

Figure 2:
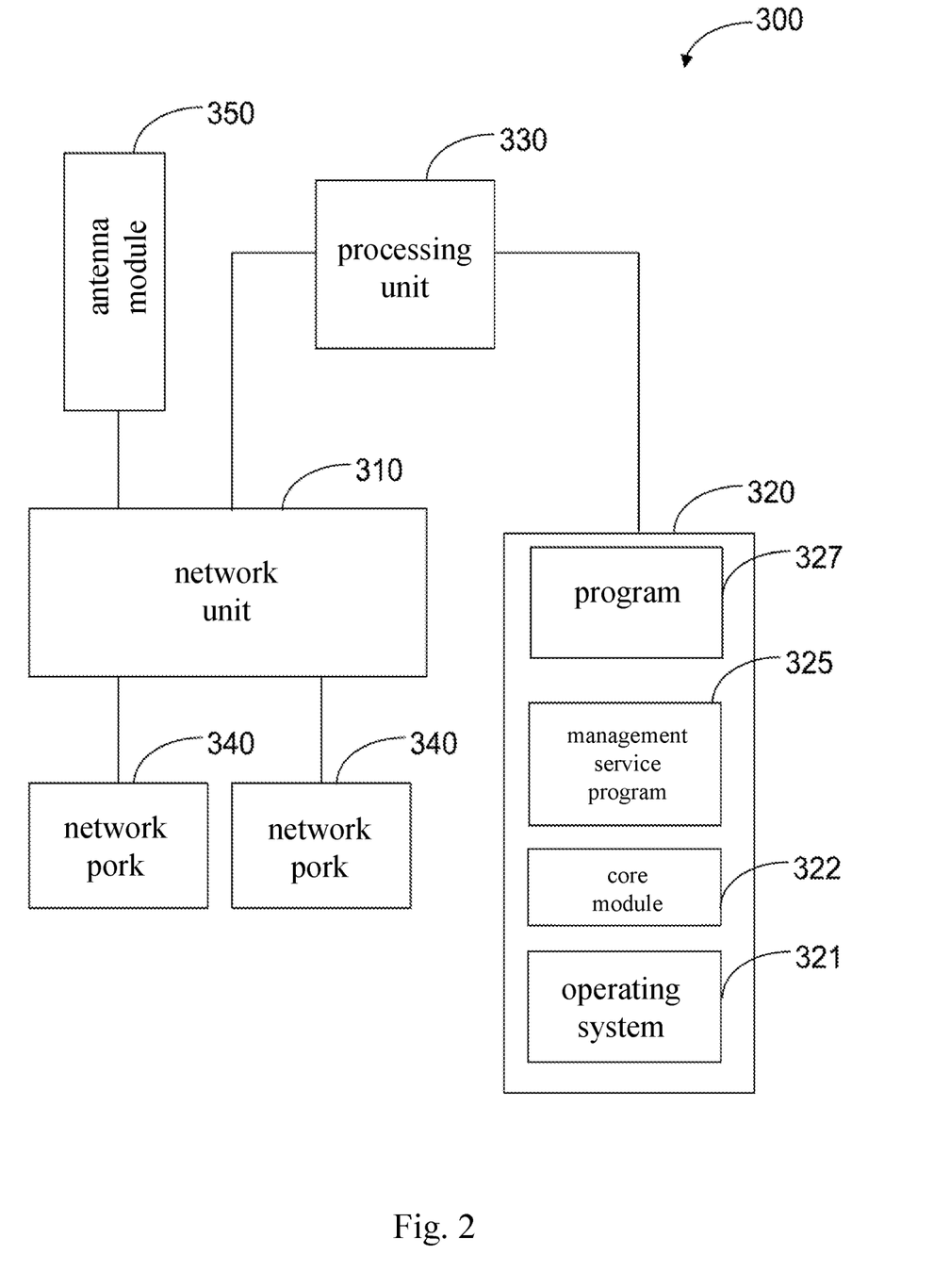
FIG. 2 shows a block diagram of an embodiment of the dynamic virtual private network device.

FIG. 2 shows a block diagram of an embodiment of a device 300 in the dynamic virtual private network. As shown in FIG. 2, the device 300 in the dynamic virtual private network includes: a network unit 310, a memory unit 320, and a processing unit 330. The network unit 310 is used to connect to the network 50. The processing unit 330 is coupled with the network unit 310 and the memory unit 320. For example, the main device 100 in the dynamic virtual private network executes an operating system 321 and preloaded with on or a plurality of core modules 322. The device 300 in the dynamic virtual private network has a setting mode. A management service program 325 is executed in the setting mode. The management service program 325 may be used to carry out settings of connections, e.g. settings of a whitelist, password, etc. In addition, other program 327 can be optionally executed to carry on data processing. In addition, the device 300 in the dynamic virtual private network shown in FIG. 2 is suitable for implementing the main device 100 or the sub-device 200 in the dynamic virtual private network. However, the present invention doesn't restrict the architecture and implementation of the main device 100 or the sub-device 200 in the dynamic virtual private network. During implementation, it is able to implement the main device 100 or the sub-device 200 in the dynamic virtual private network by different hardware/software according to the requirements of products and users. For instance, it may implement the main device 100 (or sub-device 200) in the dynamic virtual private network as, with the same or different specifications, any one of wired and/or wireless network sharer, a router, or a wireless network sharer or router with integrated mobile communications (supporting at least one communication standard of 3G, 4G, 4.5G or later). For example, the device 300 in the dynamic virtual private network may have one or more network ports 340 and antenna modules 350.

In order to solve the difficulty when processing basic connection settings between virtual private network servers and virtual private network client ends, in some embodiments of the present invention, the main device 100 in the dynamic virtual private network and the sub-device 200 have setting modes, which make it more convenient and friendly for users to set up connections of the dynamic virtual private network, such as the whitelist, significantly simplifying procedure of connection settings and reducing time to establish the dynamic virtual private network. It can also enhance convenience and security in setting the dynamic virtual private network.

Figure 3:
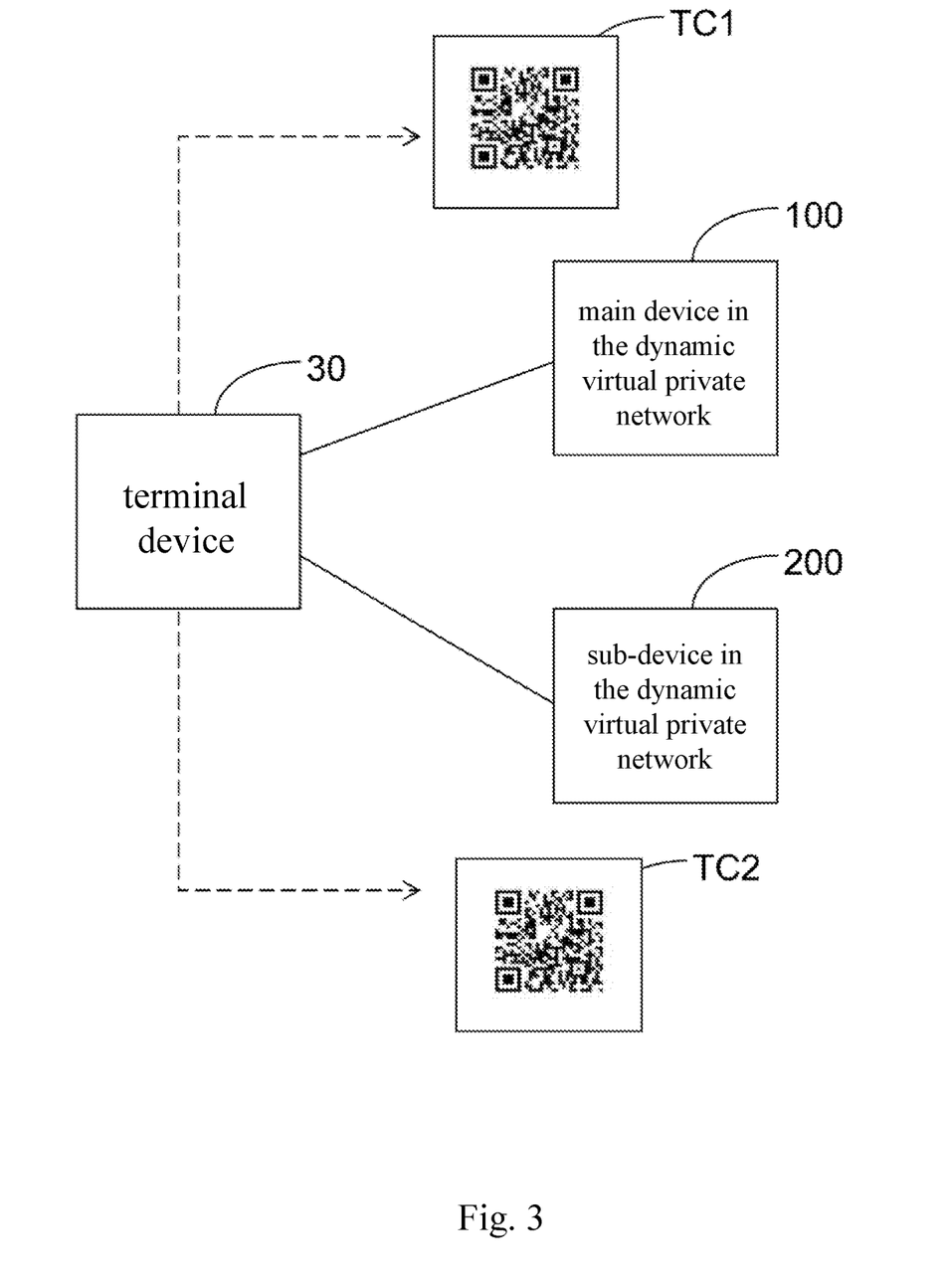
FIG. 3 shows a schematic block diagram of an embodiment for setting a main device in a dynamic virtual private network and a sub-device in the dynamic virtual private network.

FIG. 3 shows a schematic block diagram of an embodiment for setting the main device 100 in the dynamic virtual private network and the sub-device 200 in the dynamic virtual private network. As shown in FIG. 2, the terminal device 30 may be a smart phone, a tablet or a notebook. It may be configured to wirelessly connect to (through e.g. Bluetooth, a wireless local area network, or other wireless connections) the main device 100 in the dynamic virtual private network and the sub-device 200 and carry out programs, e.g. Exclusive APPs, or a web browser, thereby to execute settings of connections between the main device 100 in the dynamic virtual private network and the sub-device 200. In addition, as shown in FIG. 3, the main device 100 in the dynamic virtual private network and the sub-device 200 respectively relate to two identifying images, such as two-dimensional barcodes TC1 and TC2, for identifying the two devices. Namely, after the terminal device 30 reads the two-dimensional barcode TC1, it is to carry out settings of the main device 100 in the dynamic virtual private network by identifying information, such as an identifier, in the two-dimensional barcode TC1. After the terminal device 30 reads two-dimensional barcode TC2, it is to carry out settings of the sub-device 200 in the dynamic virtual private network by, for instance, identifying information, in the two-dimensional barcode TC2. During implementation, it is able to endow a unique identifying image for each main device and each sub-device. This can help simplify the steps required for settings. The identifying image, e.g. the two-dimensional barcode, related to the main device 100 (or sub-device 200) in the dynamic virtual private network may be presented by printing or any way to form on objects, or in a form of an electronic file for installation and settings. For example, identifying images such as the two-dimensional barcode TC1 and TC2 can be formed on the housings of the main device 100 in the dynamic virtual private network and the sub-device 200, respectively. However, the present invention is not limited by the examples. Those identifying images (two-dimensional barcodes) may also be printed on a manual or a tag of the products to facilitate users to carry or use. In addition, the identifying image (two-dimensional barcode) may also be in the form of an electronic to transmit electronically or presented on the terminal device, so as to conveniently scan or interpret the identifying information therein.

Embodiments below are used to illustrate the operating methods for the setting modes of the main device 100 in the dynamic virtual private network and the sub-device, respectively.

Please refer to FIG. 2 and FIG. 3 again. For users, when setting the main device 100 in the dynamic virtual private network, it is able to carry out settings of the main device 100 in the dynamic virtual private network by reading (or scanning) the two-dimensional barcode TC1 of the main device 100 in the dynamic virtual private network by the terminal device 30. Thereby, an application program, e.g. an APP or a browser, of the terminal device 30 communicates with a management service program communication executed in the setting mode of the main device 100 in the dynamic virtual private network to carry out settings. Next, it is able to directly add the identifying information of the sub-device 200 in the dynamic virtual private network to a whitelist recorded in the main device 100 in the dynamic virtual private network by reading (or scanning) a two-dimensional barcode TC2 related to the sub-device 200 in the dynamic virtual private network by the terminal device 30. In addition, users set a verification code of the sub-device 200 in the dynamic virtual private network through the terminal device 30. The verification code is required when requesting to add to the whitelist. In addition, users set a connection code required when the sub-device 200 in the dynamic virtual private network send a request for connecting to the main device 100 in the dynamic virtual private network through the terminal device 30. Then, users can optionally edit a list related to the sub-device 200 in the dynamic virtual private network through the terminal device 30. Thereby, it is easily to finish settings of the main device 100 in the dynamic virtual private network. After the main device 100 in the dynamic virtual private network reboots, it is able to operate according to above settings.

In addition, when implementing said method, the device 300 in the dynamic virtual private network shown in FIG. 2 can be configured as the main device 100 in the dynamic virtual private network and have a management service program. Ask the processing unit 330 to execute the management service program to implement the method for setting mentioned above.

Please refer to FIG. 2 and FIG. 3 again. For users, when they set the sub-device 200 in the dynamic virtual private network, it may read (or scan) the two-dimensional barcode TC2 of the sub-device 200 in the dynamic virtual private network through the terminal device 30 to execute settings of the sub-device 200 in the dynamic virtual private network. Thereby, the application program (an APP or a browser) of the terminal device 30 communicates with the management service program executed in the setting mode of the sub-device 200 in the dynamic virtual private network to process settings. Then, after a two-dimensional barcode related to the main device 100 in the dynamic virtual private network (or other main devices) is read (or scanned) by the terminal device 30, it is able to add the main device 100 in the dynamic virtual private network to the whitelist directly by connecting, such as a LAN or communication way, e.g. Bluetooth, or indirectly, e.g. through a third-party cloud service. Regarding how to indirectly add through the third-party cloud service, details will be provided in the embodiments later on. In addition, users set the verification code required when the sub-device 200 is added to the main device 100 in the dynamic virtual private network (or other main devices) through the terminal device 30. In addition, users can also set the connection code required when the sub-device 200 sends a request for connecting to the main device 100 in the dynamic virtual private network (or other main devices) through the terminal device 30. Then, users may optionally edit the list related to main devices in the dynamic virtual private network in the sub-device 200 through the terminal device 30. Thereby, it is easily to finish settings of the sub-device 200 in the dynamic virtual private network. After the sub-device 200 in the dynamic virtual private network reboots, it is able to operate according to above settings. In addition, in one embodiment, if the list related to the main devices in the dynamic virtual private network in the sub-device 200 has recorded one or a plurality of main devices (e.g. record of their identifying information), it can further choose a desired main device in the dynamic virtual private network to connect. Thus, after rebooting, the sub-device 200 in the dynamic virtual private network will actively send a request for connecting to the chosen main device in the dynamic virtual private network, further establishing a tunneling connection.

In addition, when implementing said method, the device 300 in the dynamic virtual private network shown in FIG. 2 can be configured as the sub-device 200 in the dynamic virtual private network and have a management service program. Ask the processing unit 330 to execute the management service program to implement the method for setting mentioned above.

In the above embodiment, any identifying image (e.g. a two-dimensional barcode) can be used to contain identifying information of the main device or sub-device in the dynamic virtual private network can be used to implement above embodiment of the present invention. The two-dimensional barcode may be PDF417 code, QR code, Han Xin code, colored barcode or quick mark code. However, the present invention is not restricted by such examples. For example, those identifying images may also be any image that can identify the devices.

In addition, in some embodiments, connection settings of the main device 100 in the dynamic virtual private network and the sub-device 200 are not limited to above embodiment, it is workable to directly enter relevant information manually after the terminal device 30 is used to connect to the main device 100 in the dynamic virtual private network or sub-device 200.

In addition, in some embodiments below, multiple embodiments are provided for the method for the dynamic virtual private network. For example, before the main device and the sub-device in the dynamic virtual private network establish the tunneling connection, the main device and the sub-device in dynamic virtual private network can communicate using the third-party cloud service. Thereby, a request for adding to the whitelist can be dealt with or sent, or an operation such as a request for tunneling connection can be dealt or sent.

During implementation, programs or software modules which can connect to one or a plurality of third-party cloud services may be deployed in the main device and the sub-device in the dynamic virtual private network, respectively. Utilizing the functions of communication or data download in the third-party cloud service, before the tunneling connection between the main device and the sub-device in the dynamic virtual private network is established, data acquired through the third-party cloud service are parsed, filtered and/or identified by any data mining method to learn whether this information is useful or whether it should be answered or further processed. In order to communicate information to each other by using the third-party cloud service, it may endow any main device and sub-device in the dynamic virtual private network identifying information or make them related to the identifying information according to the present invention. The identifying information, for example, at least contains an identification code or may further contain other data. Data to be sent include the identifying information in order to identify the source of the data or the object to be transmitted. For example, a cloud email service, e.g. Gmail, is used. The main device and the sub-device in the dynamic virtual private network can share one or a plurality of emails in the cloud email service. Thus, it is able to use any field in the email format to send information to each other. For example, the sub-device in the dynamic virtual private network sends emails with subjects attached the identifying information, e.g. an identification code, and a type of event. For instance, the subject of "ID123WL52RT3_C0001" may represent a request for No. C0001 setting (such as whitelist settings) desired to send to a device having an identification code of 123WL52RT3. For example, ID123WL52RT3_C0100 represents to send a request for C0100 setting, e.g. establishing the tunneling connection, to that device. In addition, it can further use any field in the email format to other information such as the sender's identifying information (e.g. the identification code of the sub-device in the dynamic virtual private network mentioned above) to the dynamic virtual private network main device according to communication requirements. Hence, it is workable to set up a communication protocol based on the communication or data downloading functions of the third-party cloud service. However, the present invention doesn't restrict the use of the communication protocol or the identifying information mentioned above. Hence, any way to communicate the main device and the sub-device in the dynamic virtual private network by using the third-party cloud service and the identifying information can be regarded as applicable to the embodiments of the present invention.

The third-party cloud services below are applicable to the embodiments of the present invention: for example, cloud email service (e.g. Gmail, Yahoo, MSN etc.), cloud drives or backup services (e.g. Dropbox, Google Drive, etc.), or cloud communication service (e.g. Twitter, WeChat, LINE, etc.). However, for the present invention, the kinds of third-party cloud services applicable to the present invention are not limited by above examples.

Figure 4:
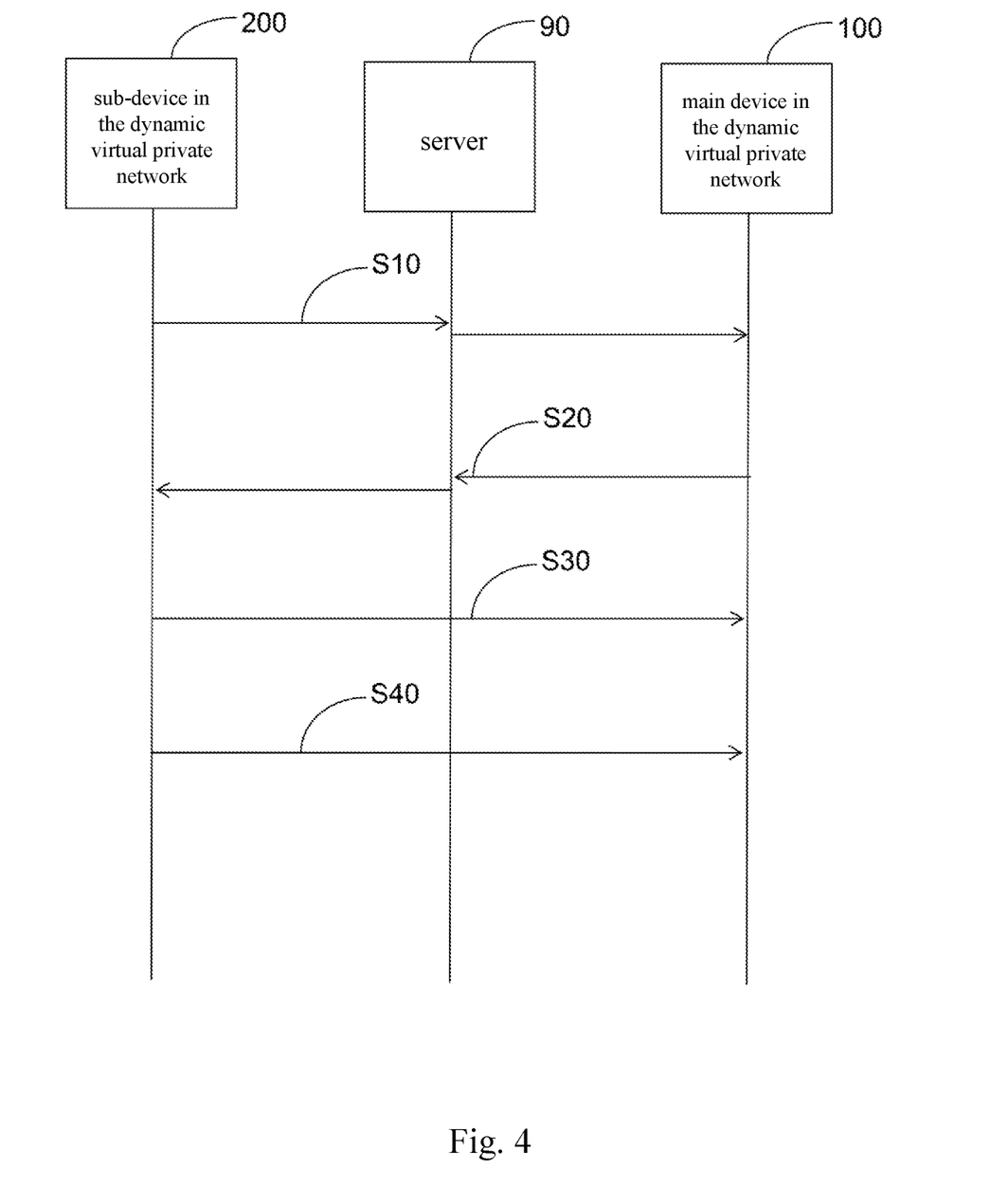
FIG. 4 shows a schematic diagram showing interaction between the main device in the dynamic virtual private network and the sub-device in the dynamic virtual private network when operating.

FIG. 4 shows a schematic diagram showing interaction between the main device in the dynamic virtual private network and the sub-device in the dynamic virtual private network when operating. As shown in FIG. 4, a step S10 represents the sub-device 200 in the dynamic virtual private network sends a message, e.g. a request for adding to the whitelist or connecting to the main device 100 in the dynamic virtual private network through the third-party cloud service, e.g. at least one server 90 providing the cloud service, and identifying information of the main device 100 in the dynamic virtual private network. A step S20 represents the main device 100 in the dynamic virtual private network sends a message, e.g. an acceptance message, a rejection message, or other information, to the sub-device 200 in the dynamic virtual private network through the third-party cloud service and the identifying information of the sub-device 200 in the dynamic virtual private network.

In addition, as shown in FIG. 4, a step S30 represents that after a tunneling connection is established between the sub-device 200 in the dynamic virtual private network and the main device 100, the connection code of the sub-device 200 in the dynamic virtual private network is sent to the main device 100 in the dynamic virtual private network through the tunneling connection. If the connection code is correct, the tunneling connection is maintained. Thus, a step S40 represents that the connection code is correct so that the sub-device 200 in the dynamic virtual private network communicates with the main device 100 in the dynamic virtual private network through the tunneling connection without going through the third-party cloud service. FIG. 4 is only an illustration. When implementing, interaction between the sub-device 200 in the dynamic virtual private network (or the main device 100) and the third-party cloud service is not restricted by such examples. The connection code is able to be further encoded to enhance security.

Below are further embodiments illustrating operations of the main device and the sub-device in the dynamic virtual private network.

Figure 5:
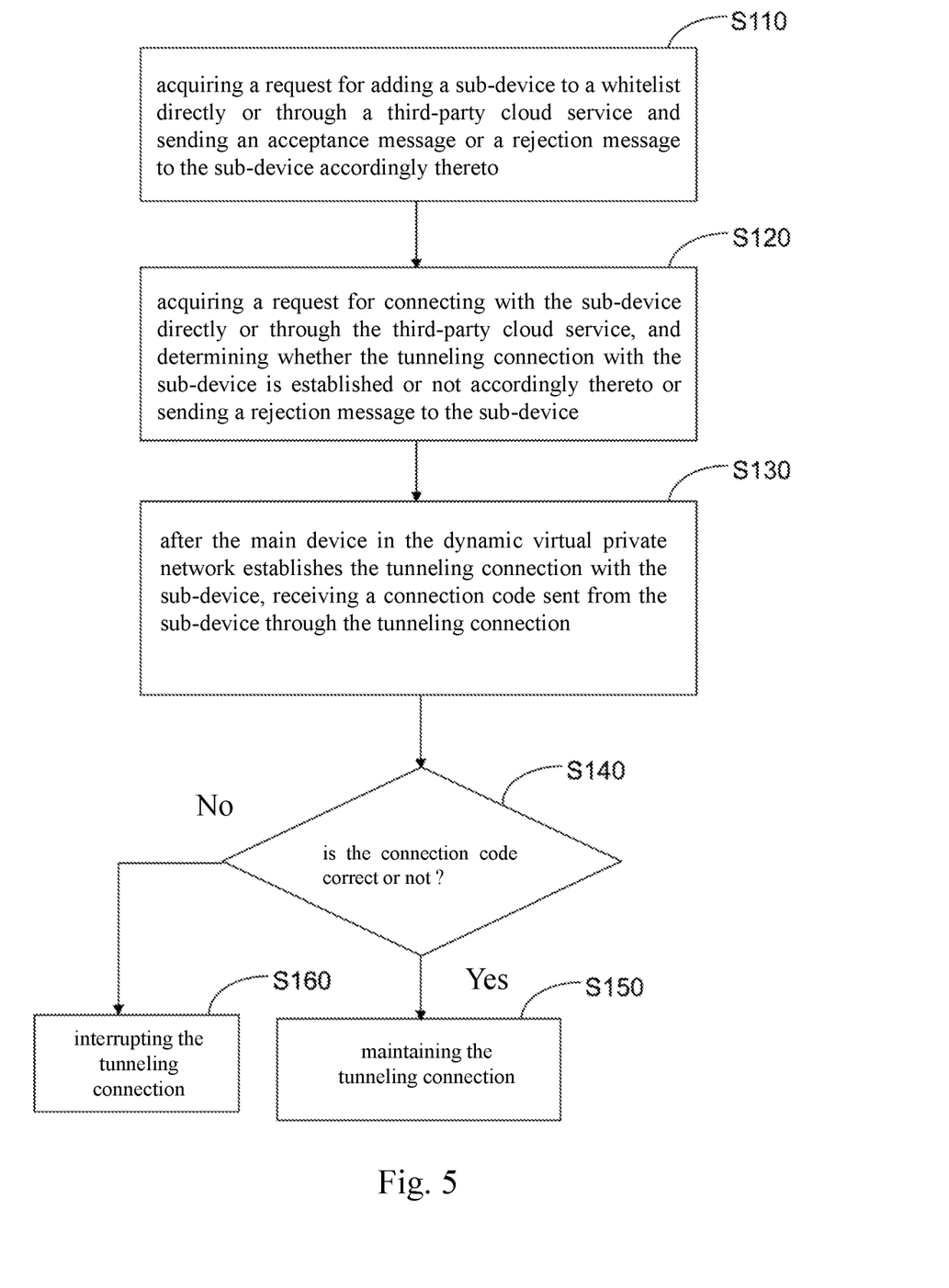
FIG. 5 shows a flow chart of an embodiment of a method suitable for the main device in the dynamic virtual private network.

FIG. 5 shows a flow chart of an embodiment of a method suitable for a main device in the dynamic virtual private network. As shown in FIG. 5, the method includes the following steps. As shown in a step S110, before the main device in the dynamic virtual private network establishes a tunneling connection, acquire a request for adding a sub-device to a whitelist directly or through a third-party cloud service and send an acceptance message or a rejection message to the sub-device accordingly thereto. As shown in a step S120, before the main device in the dynamic virtual private network establishes the tunneling connection, acquire a request for connecting with the sub-device directly or through the third-party cloud service, and determine whether the tunneling connection with the sub-device is established or not accordingly thereto or send a rejection message to the sub-device. As shown in a step S130, after the main device in the dynamic virtual private network establishes the tunneling connection with the sub-device, receive a connection code sent from the sub-device through the tunneling connection. As shown in a step S140, determine whether the connection code sent from the sub-device is correct or not. As shown in a step S150, if the connection code is correct, maintain the tunneling connection. As shown in a step S160, if the connection code is incorrect, interrupt the tunneling connection. The connection code is able to be further encoded to enhance security.

In addition, in said method for the dynamic virtual private network for the main device in the dynamic virtual private network, it is not limited by the order of the steps shown in FIG. 5. During implementation, the step S110 can be used to deal with a request for adding a sub-device A to a whitelist, while the step S120 can be used to deal with a request for connecting with the same sub-device A. However, the present invention is not limited thereby. Namely, the step S110 can be used to deal with a request for adding a sub-device A to a whitelist, while the step S120 can be used to deal with a request for connecting with another sub-device B. So the present invention is not limited by the order of the steps shown in FIG. 5. In addition, the step S110 can also deal with the request for adding to the whitelist indirectly sent (namely through the third-party cloud service) after the terminal device 30 scans the two-dimensional barcode TC1 of the main device in the setting mode in FIG. 3. In addition, the step S120 and S130 can also be used to deal with a request for connecting sent actively from the sub-device to the chosen main device after the sub-device has been set to connect to one main device and rebooted in the setting mode in FIG. 3. Hence, the embodiment shown in FIG. 5 is not limited by the order of the steps shown in FIG. 5.

Figure 6:
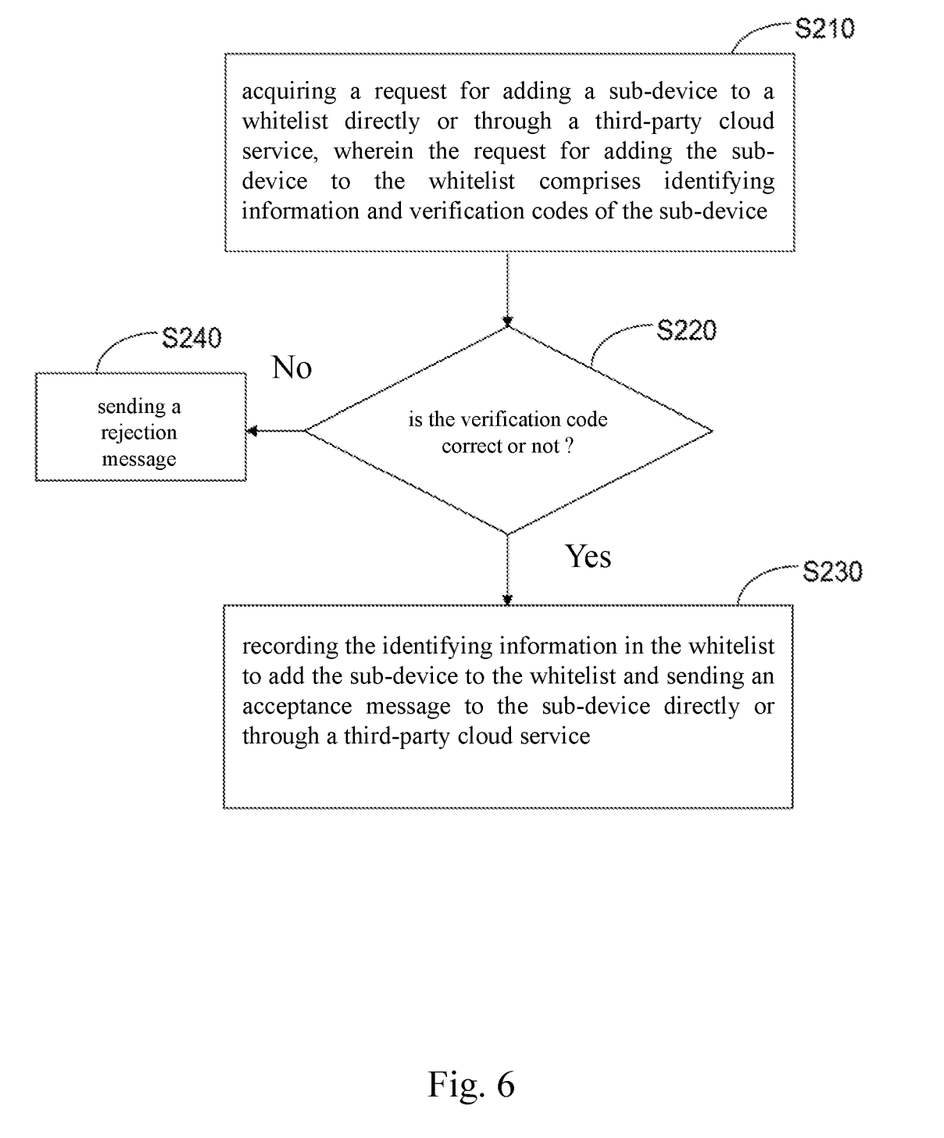
FIG. 6 shows a flow chart of an embodiment of a method suitable for the main device in the dynamic virtual private network.

FIG. 6 shows a flow chart of an embodiment of the step S110 in FIG. 5. As shown in FIG. 6, the step S110 may include following steps. As shown in a step S210, before the main device in the dynamic virtual private network establishes the tunneling connection, acquire a request for adding a sub-device to a whitelist directly or through a third-party cloud service, wherein the request for adding the sub-device to the whitelist comprises identifying information and verification codes of the sub-device. As shown in a step S220, determine whether the verification code is correct or not. As shown in a step S230, if the verification code is correct, record the identifying information in the whitelist, which means to add the sub-device to the whitelist and send an acceptance message to the sub-device directly or through a third-party cloud service. As shown in a step S240, if the verification code is incorrect, send a rejection message to the sub-device directly or through the third-party cloud service.

Figure 7:
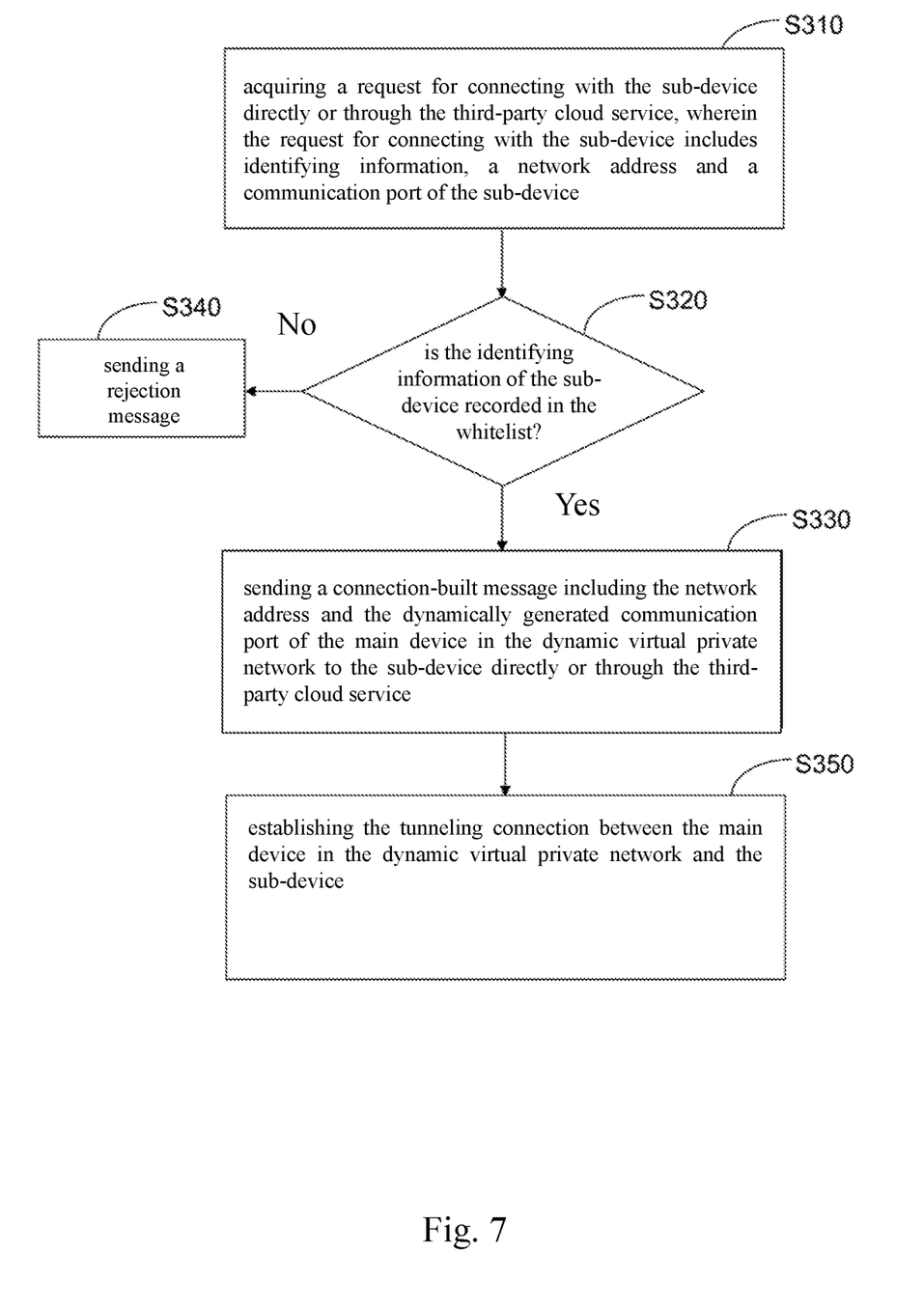
FIG. 7 shows a flow chart of an embodiment of a method suitable for the main device in the dynamic virtual private network.

FIG. 7 shows a flow chart of an embodiment of the step S120 in FIG. 5. As shown in FIG. 7, the step S120 may include following steps. As shown in a step S310, before the main device in the dynamic virtual private network establishes the tunneling connection, acquiring a request for connecting with the sub-device directly or through the third-party cloud service. The request for connecting with the sub-device includes identifying information, a network address and a communication port of the sub-device. The communication port can be dynamically generated. As shown in a step S320, determine whether the identifying information of the sub-device is recorded in the whitelist of the main device in the dynamic virtual private network. As shown in a step S330, if the identifying information of the sub-device is recorded in the whitelist, send a connection-built message including the network address and the dynamically generated communication port of the main device in the dynamic virtual private network to the sub-device directly or through the third-party cloud service. Thereby, as shown in a step S350, the tunneling connection is established between the main device in the dynamic virtual private network and the sub-device.

In addition, as shown in a step S340, if the identifying information of the sub-device is not recorded in the whitelist, send a rejection message to the sub-device directly or through the third-party cloud service. However, the present invention is not limited by the above examples. For instance, on some other embodiments, if the identifying information of the sub-device is not recorded in the whitelist, a message may be sent to request the sub-device to input the verification code, so as to record the identifying information in the whitelist or to perform other processes.

Figure 8:
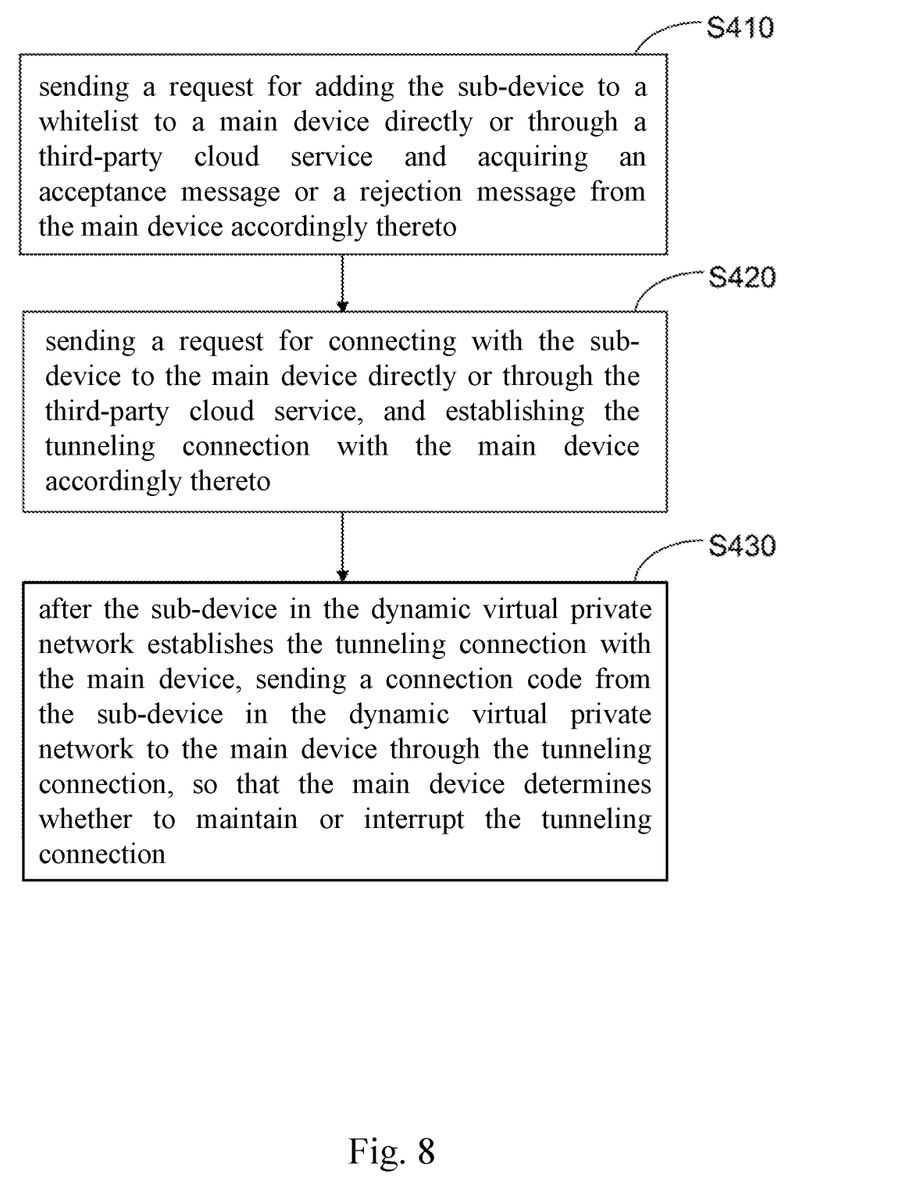
FIG. 8 shows a flow chart of an embodiment of a method suitable for the sub-device in the dynamic virtual private network.

FIG. 8 shows a flow chart of an embodiment of a method suitable for a sub-device in the dynamic virtual private network. As shown in FIG. 8, the method includes following steps. Those steps may correspond to the steps in FIG. 5 executed by the main device. As shown in a step S410, before the sub-device in the dynamic virtual private network establishes a tunneling connection, send a request for adding the sub-device to a whitelist to a main device directly or through a third-party cloud service and acquire an acceptance message or a rejection message from the main device accordingly thereto. As shown in a step S420, before the sub-device in the dynamic virtual private network establishes the tunneling connection, send a request for connecting with the sub-device to the main device directly or through the third-party cloud service, and establish the tunneling connection with the main device accordingly thereto. As shown in a step S430, after the sub-device in the dynamic virtual private network establishes the tunneling connection with the main device, send a connection code from the sub-device in the dynamic virtual private network to the main device through the tunneling connection, so that the main device determines whether to maintain or interrupt the tunneling connection. The connection code is able to be further encoded to enhance security.

In addition, in said method for the dynamic virtual private network for the sub-device in the dynamic virtual private network, it is not limited by the order of the steps shown in FIG. 8. During implementation, the step S410 can be used to send a request for adding to the whitelist to a main device, while the step S420 can be used to send a request for connecting to the same main device. However, the present invention is not limited thereby. Namely, the step S410 can be used to send a request for adding to the whitelist to a main device P, while the step S420 can be used to send a request for connecting to other main device Q. So, the present invention is not limited by the order of the steps shown in FIG. 8. In addition, the step S410 can also deal with the request for adding to the whitelist indirectly sent (namely through the third-party cloud service) after the terminal device 30 scans the two-dimensional barcode TC1 of the main device in the setting mode in FIG. 3. In addition, the step S420 and S430 can also be used to deal with a request for connecting sent actively from the sub-device to the chosen main device after the sub-device has been set to connect to one main device and rebooted in the setting mode in FIG. 3. Hence, the embodiment shown in FIG. 8 is not limited by the order of the steps shown in FIG. 8.

Figure 9:
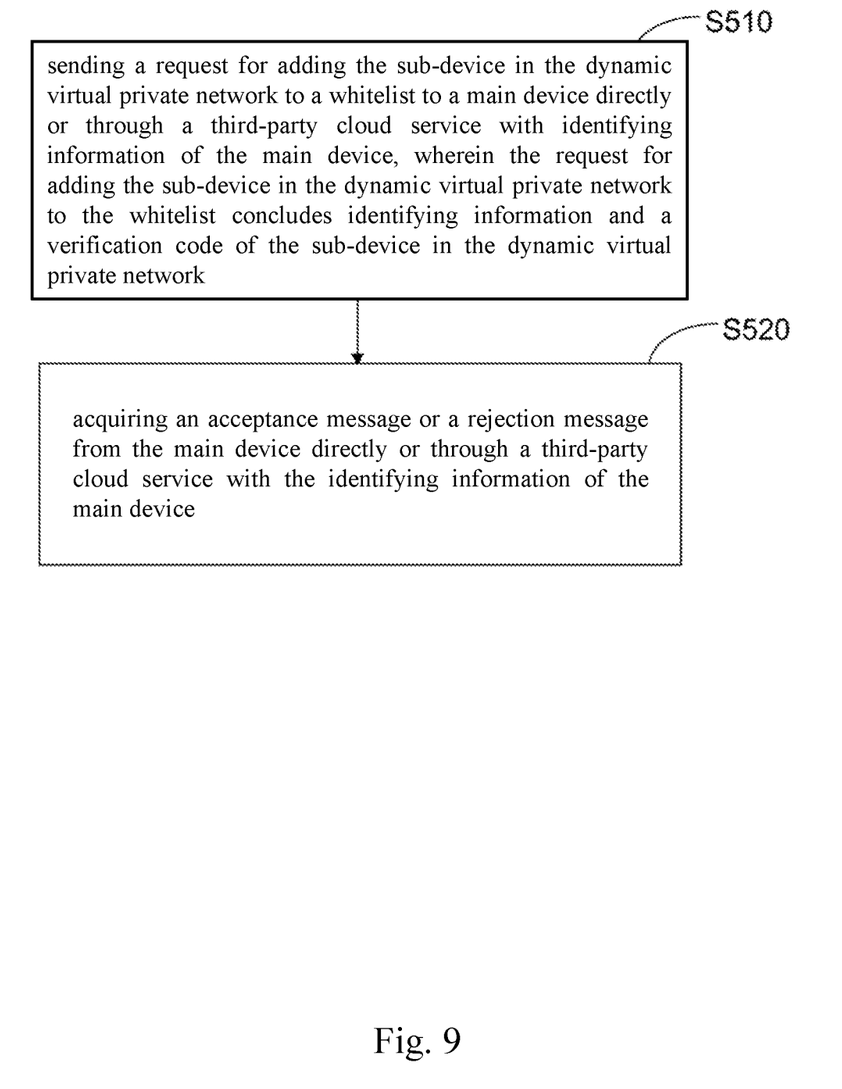
FIG. 9 shows a flow chart of an embodiment of a method suitable for the sub-device in the dynamic virtual private network.

FIG. 9 shows a flow chart of an embodiment of the step S410 in FIG. 8. As shown in FIG. 9, the step S410 may include following steps. As shown in a step S510, before the sub-device in the dynamic virtual private network establishes the tunneling connection, send a request for adding the sub-device in the dynamic virtual private network to a whitelist to a main device directly or through a third-party cloud service with identifying information of the main device. The request for adding the sub-device in the dynamic virtual private network to the whitelist concludes identifying information and a verification code of the sub-device in the dynamic virtual private network. As a step S520 shown, acquire an acceptance message or a rejection message from the main device directly or through a third-party cloud service with the identifying information of the main device.

Figure 10:
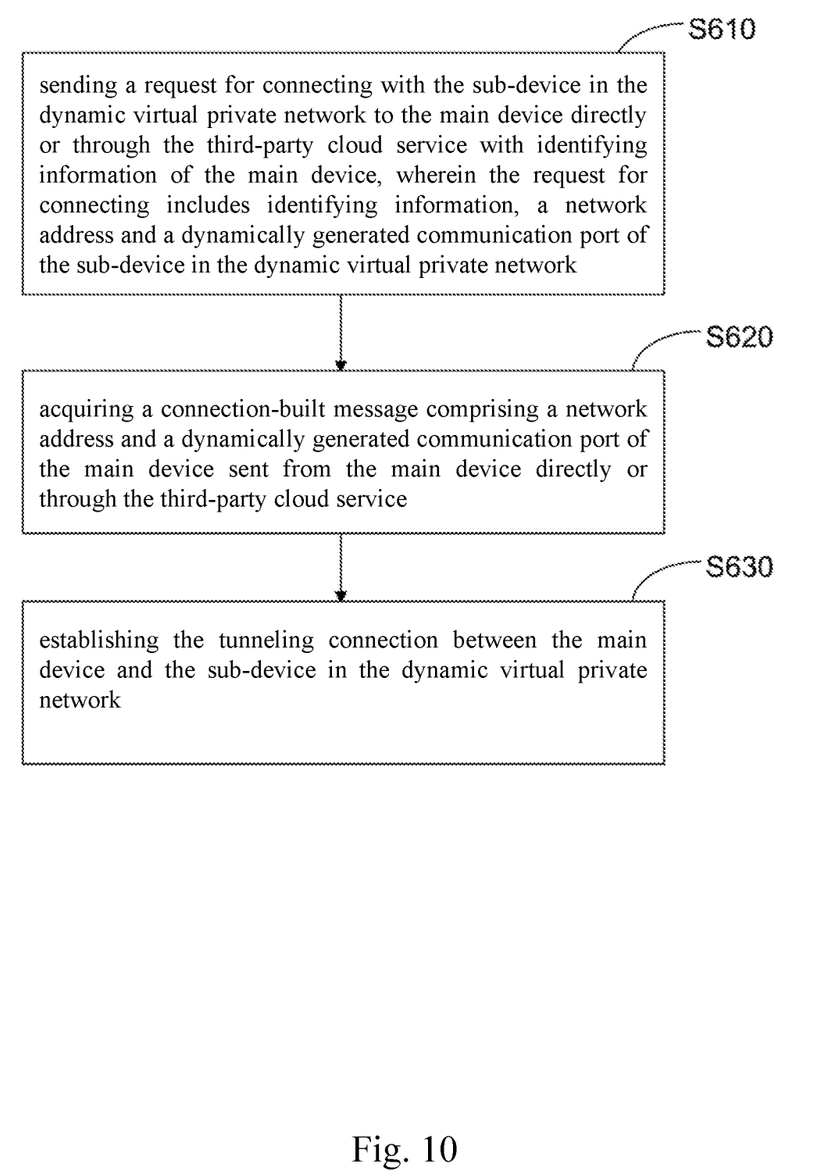
FIG. 10 shows a flow chart of an embodiment of a method suitable for the sub-device in the dynamic virtual private network.

FIG. 10 shows a flow chart of an embodiment of the step S420 in FIG. 8. As shown in FIG. 10, the step S420 may include following steps. As shown in a step S610, before the sub-device in the dynamic virtual private network establishes the tunneling connection, send a request for connecting with the sub-device in the dynamic virtual private network to the main device directly or through the third-party cloud service with identifying information of the main device. The request for connecting with the sub-device in the dynamic virtual private network includes identifying information, a network address and a dynamically generated communication port of the sub-device in the dynamic virtual private network. As shown in a step S620, acquire a connection-built message comprising a network address and a dynamically generated communication port of the main device sent from the main device directly or through the third-party cloud service. Thereby, as shown in a step S630, the tunneling connection is established between the main device and the sub-device in the dynamic virtual private network.

In addition, in other embodiments, if the identifying information is not recorded in the whitelist of the sub-device, the sub-device in the dynamic virtual private network will directly or through third-party cloud service acquire the rejection message sent from the main device. However, the present invention is not limited by above examples. For instance, in other embodiments, if the identifying information is not recorded in the whitelist of the sub-device, the main device in the dynamic virtual private network sub-device will acquire the message requesting the sub-device to input the verification code, so as to record the identifying information in the whitelist or to perform other processes.

Some embodiments of the present invention further provide a computer or computing device readable recording medium which is stored with codes, one or more programs, or program modules. When one or more programs are carried out by a device in the dynamic virtual private network, it is caused to the dynamic virtual private network to perform the embodiments according to FIG. 5 to FIG. 10, or any combined method thereof for managing virtual channels. The readable recording media in these embodiments are, but not limited to, optical information storage media, magnetic information storage media or memory, such as memory cards, firmware, ROM, RAM, or programmable microcontroller built-in memory.

In addition, in other embodiments of the present invention, a main device in the dynamic virtual private network is provided. It includes: a network unit, connected to a network, providing a network communication; a memory unit; and a processing unit, coupled with the network unit and the memory unit. Before the main device in the dynamic virtual private network establishes a tunneling connection, the processing unit controls the network unit directly or through a third-party cloud service to acquire a request for adding a sub-device to a whitelist, and send an acceptance message or a rejection message to the sub-device accordingly thereto. Before the main device in the dynamic virtual private network establishes the tunneling connection, the processing unit controls the network unit directly or through the third-party cloud service to acquire a request for connecting with the sub-device, and the processing unit determines whether the tunneling connection with the sub-device is established or not accordingly thereto or sending a rejection message to the sub-device. After the main device in the dynamic virtual private network establishes the tunneling connection with the sub-device, the processing unit controls the network unit to receive a connection code sent from the sub-device through the tunneling connection, and the processing unit determines whether the connection code sent from the sub-device is correct or not; if the connection code is correct, the processing unit maintains the tunneling connection; if the connection code is incorrect, the processing unit controls the network unit to interrupt the tunneling connection; wherein the connection code is able to be further encoded to enhance security. The main device in the dynamic virtual private network can implement any embodiment of method suitable for the main device in the dynamic virtual private network in the present invention as that shown in FIG. 3 to FIG. 7.

In other embodiments of the present invention, a sub-device in the dynamic virtual private network is provided. It includes: a network unit, connected to a network, providing a network communication; a memory unit; and a processing unit, coupled with the network unit and the memory unit. Before the sub-device in the dynamic virtual private network establishes a tunneling connection, the processing unit controls the network unit directly or through a third-party cloud service to send a request for adding the sub-device in the dynamic virtual private network to a whitelist to the main device, and acquire an acceptance message or a rejection message from the main device accordingly thereto. Before the sub-device in the dynamic virtual private network establishes a tunneling connection, the processing unit controls the network unit directly or through the third-party cloud service to send a request for connecting the sub-device in the dynamic virtual private network to the main device, and establish the tunneling connection with the main device. After the sub-device in the dynamic virtual private network establishes the tunneling connection with the main device, the processing unit controls the network unit through the tunneling connection to send a connection code of the sub-device in the dynamic virtual private network to the main device, so that the main device determines whether to maintain or interrupt the tunneling connection. The connection code is able to be further encoded to enhance security. The sub-device in the dynamic virtual private network can implement any embodiment of method suitable for the sub-device in the dynamic virtual private network in the present invention as that shown in FIG. 3, FIG. 4, and FIG. 8 to FIG. 10.

For example, the main device or the sub-device in the dynamic virtual private network mentioned above may refer to the architecture in FIG. 2 and be implemented according to the requirements of the products. However, the present invention is not limited by the examples in FIG. 2 and can be achieved by using any architecture.

As mentioned above, while the invention has been described in embodiments, however, the present invention is not limited by the embodiments. For those who are of ordinary skill in the art of the present invention, it is intended to cover various modifications and similar arrangements included within the spirit and scope of the present invention, for example, combining or changing the technical contents exemplified in the foregoing embodiments into new embodiments. These embodiments of course are also regarded as one of the contents of the present invention. Therefore, the scope of protection in the application also includes the scope of claims mentioned below and the defined scope thereby.

What is claimed is:

1. A method for a dynamic virtual private network, suitable for a main device in a dynamic virtual private network, comprising the steps of:

(a) before the main device in the dynamic virtual private network establishes a tunneling connection, acquiring a request for adding a sub-device to a whitelist directly or through a third-party cloud service and sending an acceptance message or a rejection message to the sub-device based on a verification codes of the sub-device;

(b) before the main device in the dynamic virtual private network establishes the tunneling connection, acquiring a request for connecting with the sub-device directly or through the third-party cloud service, and determining whether the tunneling connection with the sub-device is established or not accordingly or sending a rejection message to the sub-device; and (c) after the main device in the dynamic virtual private network establishes the tunneling connection with the sub-device, receiving a connection code sent from the sub-device through the tunneling connection, and determining whether the connection code sent from the sub-device is correct or not;

if the connection code is correct, the tunneling connection is maintained;

if the connection code is incorrect, the tunneling connection is interrupted;

wherein the connection code is able to be further encoded to enhance security.

2. The method for a dynamic virtual private network according to claim 1, wherein the step (a) comprises:

before the main device in the dynamic virtual private network establishes the tunneling connection:

acquiring a request for adding a sub-device to a whitelist directly or through a third-party cloud service, wherein the request for adding the sub-device to the whitelist comprises identifying the sub-device information;

determining whether the verification code is correct or not; and if the verification code is correct, recording the identifying information in the whitelist to add the sub-device to the whitelist and sending an acceptance message to the sub-device directly or through a third-party cloud service; or if the verification code is incorrect, sending a rejection message to the sub-device directly or through the third-party cloud service.

3. The method for a dynamic virtual private network according to claim 1, wherein the step (b) comprises:

before the main device in the dynamic virtual private network establishes the tunneling connection, acquiring a request for connecting with the sub-device directly or through the third-party cloud service, wherein the request for connecting with the sub-device comprises identifying information, a network address and a dynamically generated communication port of the sub-device;

determining whether the identifying information of the sub-device is recorded in the whitelist of the main device in the dynamic virtual private network; and if the identifying information of the sub-device is recorded in the whitelist, sending a connection-built message comprising the network address and the dynamically generated communication port of the main device in the dynamic virtual private network to the sub-device directly or through the third-party cloud service, so that the tunneling connection is established between the main device in the dynamic virtual private network and the sub-device.

4. A non-transitory computer readable recording medium, stored with one or more program modules, causing a device in a dynamic virtual private network to perform the method according to claim 1 when said one or more program modules are carried out by the device in the dynamic virtual private network.

5. The non-transitory computer readable recording medium according to claim 4, wherein the computer readable recording medium further causes the device in the dynamic virtual private network to perform the method according to claim 2 when said one or more program modules are carried out by the device in the dynamic virtual private network.

6. The non-transitory computer readable recording medium according to claim 4, wherein the computer readable recording medium further causes the device in the dynamic virtual private network to perform the method according to claim 3 when said one or more program modules are carried out by the device in the dynamic virtual private network.

7. A dynamic virtual private network device, suitable for a main device in a dynamic virtual private network, comprising:

a network interface, connected to a network, providing a network communication;

a memory; and a, processor, coupled with the network interface and the memory, wherein:

before the main device in the dynamic virtual private network establishes a tunneling connection, the processing unit controls the network interface directly or through a third-party cloud service to acquire a request for adding a sub-device to a whitelist, and send an acceptance message or a rejection message to the sub-device based on a verification codes of the sub-device;

before the main device in the dynamic virtual private network establishes the tunneling connection, the processor controls the network interface directly or through the third-party cloud service to acquire a request for connecting with the sub-device, and the processor determines whether the tunneling connection with the sub-device is established or not accordingly thereto or sending a rejection message to the sub-device;

after the main device in the dynamic virtual private network establishes the tunneling connection with the sub-device, the processor controls the network interface to receive a connection code sent from the sub-device through the tunneling connection, and the processor determines whether the connection code sent from the sub-device is correct or not;

if the connection code is correct, the processor maintains the tunneling connection;

if the connection code is incorrect, the processor controls the network unit to interrupt the tunneling connection;

wherein the connection code is able to be further encoded to enhance security.

8. A method for a dynamic virtual private network, suitable for a sub-device in a dynamic virtual private network, comprising the steps of:

(a) before the sub-device in the dynamic virtual private network establishes a tunneling connection, sending a request for adding the sub-device to a whitelist to a main device directly or through a third-party cloud service and acquiring an acceptance message or a rejection message from the main device based on a verification codes of the sub-device in the dynamic virtual private network;
(b) before the sub-device in the dynamic virtual private network establishes the tunneling connection, sending a request for connecting with the sub-device to the main device directly or through the third-party cloud service, and establishing the tunneling connection with the main device accordingly thereto; and
(c) after the sub-device in the dynamic virtual private network establishes the tunneling connection with the main device, sending a connection code from the sub-device in the dynamic virtual private network to the main device through the tunneling connection, so that the main device determines whether to maintain or interrupt the tunneling connection;
wherein the connection code is able to be further encoded to enhance security.

9. The method for a dynamic virtual private network according to claim 8, wherein the step (a) comprises:
before the sub-device in the dynamic virtual private network establishes the tunneling connection:
sending a request for adding the sub-device in the dynamic virtual private network to a whitelist to a main device directly or through a third-party cloud service with identifying information of the main device, wherein the request for adding the sub-device in the dynamic virtual private network to the whitelist comprises identifying the sub-device information; and
acquiring an acceptance message or a rejection message from the main device directly or through a third-party cloud service with the identifying information of the main device.

10. The method for a dynamic virtual private network according to claim 8, wherein the step (b) comprises:
before the sub-device in the dynamic virtual private network establishes the tunneling connection, sending a request for connecting with the sub-device in the dynamic virtual private network to the main device directly or through the third-party cloud service with identifying information of the main device, wherein the request for connecting with the sub-device in the dynamic virtual private network comprises identifying information, a network address and a dynamically generated communication port of the sub-device in the dynamic virtual private network; and
acquiring a connection-built message comprising a network address and a dynamically generated communication port of the main device sent from the main device directly or through the third-party cloud service, so that the tunneling connection is established between the main device and the sub-device in the dynamic virtual private network.

11. A non-transitory computer readable recording medium, stored with one or more program modules, causing a device in a dynamic virtual private network to perform the method according to claim 8 when said one or more program modules are carried out by the device in the dynamic virtual private network.

12. The non-transitory computer readable recording medium according to claim 11, wherein the computer readable recording medium further causes the device in the dynamic virtual private network to perform the method according to claim 9 when said one or more program modules are carried out by the device in the dynamic virtual private network.

13. The non-transitory computer readable recording medium according to claim 11, wherein the computer readable recording medium further causes the device in the dynamic virtual private network to perform the method according to claim 10 when said one or more program modules are carried out by the device in the dynamic virtual private network.

14. A dynamic virtual private network device, communicating to a sub-device in a dynamic virtual private network, comprising:
a network interface, connected to a network, providing a network communication;
a memory; and
a processor, coupled with the network interface and the memory, wherein:
before the sub-device in the dynamic virtual private network establishes a tunneling connection, the processor controls the network interface directly or through a third-party cloud service to send a request for adding the sub-device in the dynamic virtual private network to a whitelist to the main device, and acquire an acceptance message or a rejection message from the main device accordingly thereto;
before the sub-device in the dynamic virtual private network establishes a tunneling connection, the processor controls the network interface directly or through the third-party cloud service to send a request for connecting the sub-device in the dynamic virtual private network to the main device, and establish the tunneling connection with the main device; and
after the sub-device in the dynamic virtual private network establishes the tunneling connection with the main device, the processor controls the network interface through the tunneling connection to send a connection code of the sub-device in the dynamic virtual private network to the main device, so that the main device determines whether to maintain or interrupt the tunneling connection;
wherein the connection code is able to be further encoded to enhance security.

* * * * *